(12) United States Patent
Yoshioka

(10) Patent No.: US 9,046,024 B2
(45) Date of Patent: Jun. 2, 2015

(54) ELECTRIC HEATING CATALYST

(75) Inventor: Mamoru Yoshioka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/981,004

(22) PCT Filed: Feb. 8, 2011

(86) PCT No.: PCT/JP2011/052627
§ 371 (c)(1),
(2), (4) Date: Jul. 22, 2013

(87) PCT Pub. No.: WO2012/107997
PCT Pub. Date: Aug. 16, 2012

(65) Prior Publication Data
US 2013/0305698 A1  Nov. 21, 2013

(51) Int. Cl.
*B01D 50/00*  (2006.01)
*F01N 3/20*  (2006.01)
*F01N 3/28*  (2006.01)
*B01D 53/94*  (2006.01)

(52) U.S. Cl.
CPC .............. *F01N 3/2889* (2013.01); *B01D 53/94* (2013.01); *F01N 3/2026* (2013.01); *F01N 3/2864* (2013.01); *F01N 3/2871* (2013.01); *F01N 3/2892* (2013.01); *F01N 2510/00* (2013.01); *Y02T 10/26* (2013.01)

(58) Field of Classification Search
USPC ................... 422/174, 177, 179, 180; 55/523; 219/69.15, 85.16
See application file for complete search history.

(56) References Cited

U.S. PATENT DOCUMENTS 5,070,694 A * 12/1991 Whittenberger ................ 60/300

FOREIGN PATENT DOCUMENTS

| EP | 2474718 A1 | 7/2012 |
| GB | 2425073 A * | 10/2006 |
| JP | 05-269387 A | 10/1993 |

* cited by examiner

*Primary Examiner* — Tom Duong
(74) *Attorney, Agent, or Firm* — Sughrue Mion, PLLC

(57) ABSTRACT

The electricity is suppressed from flowing through a case (5) of an electric heating catalyst (1). The electric heating catalyst (1) comprises a heat generating element (3) which generates heat by applying electricity; a case (5) which accommodates the heat generating element (3); an inner tube (4) which is provided between the heat generating element (3) and the case (5); a mat (6) which is provided between the heat generating element (3) and the inner tube (4) and between the inner tube (4) and the case (5) and which insulates the electricity; and an electrode (7) which is connected to the heat generating element (3) and which supplies an electric power to the heat generating element (3); wherein an insulating layer (41), which insulates the electricity, is formed on a surface of the inner tube (4); and the insulating layer (41) is formed so that a portion, which is disposed on an inner circumferential surface side (403), is thinner than a portion which is disposed on an outer circumferential surface side (402) of the inner tube.

3 Claims, 5 Drawing Sheets

ELECTRIC HEATING CATALYST

CROSS REFERENCE TO RELATED APPLICATIONS

This is a National Stage of International Application No. PCT/JP2011/052627, filed Feb. 8, 2011, the contents of all of which are incorporated herein by reference in their entirety.

TECHNICAL FIELD

The present invention relates to an electric heating catalyst.

BACKGROUND ART

A technique is known, in which a mat composed of an insulator is provided between a catalyst carrier which generates the heat by applying the electricity and a case which accommodates the catalyst carrier (see, for example, Patent Document 1). According to this mat, it is possible to suppress the electricity from flowing through the case when the electricity is applied to the catalyst carrier. However, water contained in an exhaust gas is sometimes condensed on a wall surface of an exhaust tube, for example, immediately after the startup of an internal combustion engine. The water, which is converted into the liquid, flows to the downstream side while being pushed by the exhaust gas, and the water arrives at the catalyst. If the water in the liquid state enters the mat, and the water arrives at an electrode, then the insulation resistance between the electrode and the case is lowered, and hence it is feared that the electricity may flow from the electrode to the case.

In order to suppress the water from passing through the mat and arriving at the catalyst carrier, the mat is divided by an inner tube in some cases. However, the heat from the catalyst and the heat of the exhaust gas are hardly transferred to the outside beyond the inner tube. Therefore, the temperature of the mat existing outside the inner tube is hardly raised. Further, the heat is released to the outside of the case from the mat existing outside the inner tube. Therefore, the temperature of the mat existing outside the inner tube is easily lowered. Therefore, the water, which enters the mat disposed outside the inner tube, tends to stay in the mat without being evaporated. The insulation resistance value between the electrode and the case is lowered by the water allowed to stay in the mat. Therefore, it is feared that the electricity may flow from the electrode to the case.

PRECEDING TECHNICAL DOCUMENTS

Patent Document

Patent Document 1: JP05-269387A.

SUMMARY OF THE INVENTION

Task to be Solved by the Invention

The present invention has been made taking the foregoing problem into consideration, an object of which is to suppress the electricity from flowing through a case of an electric heating catalyst.

Solution for the Task

In order to achieve the object as described above, according to the present invention, there is provided an electric heating catalyst comprising:

a heat generating element which generates heat by applying electricity;
a case which accommodates the heat generating element;
an inner tube which is provided between the heat generating element and the case;
a mat which is provided between the heat generating element and the inner tube and between the inner tube and the case and which insulates the electricity; and
an electrode which is connected to the heat generating element and which supplies an electric power to the heat generating element, wherein:
an insulating layer, which insulates the electricity, is formed on a surface of the inner tube; and
the insulating layer is thin at a portion which is disposed on an inner circumferential surface side as compared with a portion which is disposed on an outer circumferential surface side of the inner tube.

The heat generating element (heat generator) may be a carrier for a catalyst (catalyst carrier), and the heat generating element can be also provided on the upstream side from the catalyst. The heat generating element generates the heat by applying the electricity to the heat generating element. Accordingly, it is possible to raise the temperature of the catalyst. The inner tube (inner pipe) divides the mat into the part disposed on the case side and the part disposed on the heat generating element side. Further, the inner tube is supported by the mat. Therefore, the inner tube is not brought in contact with the heat generating element and the case.

Water is contained in the exhaust gas of an internal combustion engine. Therefore, water is sometimes condensed, for example, on the case. The water flows along the inner surface of the case, and the water adheres to the mat. After that, the water is absorbed by the mat. The mat is divided by the inner tube. Therefore, the water, which flows along the inner surface of the case, adheres to the part or portion of the mat disposed outside the inner tube. Owing to the presence of the inner tube, the water is suppressed from entering the part or portion of the mat disposed inside the inner tube. The insulating layer is formed on the surface of the inner tube. Therefore, even when a metal is used for the inner tube, the electricity is suppressed from flowing through the inner tube.

In the meantime, as for the insulating material used for the insulating layer, the higher the temperature is, the more lowered the insulation resistance value is. That is, the higher the temperature is, the more easily the electricity flows. Further, the thicker the insulating layer is, the larger the insulation resistance value is. Therefore, it is possible to suppress the decrease in the insulation resistance value when the insulating layer is thickened at any portion at which the temperature is relatively high.

However, the insulating material also has the heat insulation performance. Therefore, the thicker the insulating layer is, the higher the heat insulation performance is. Therefore, if the insulating layer is excessively thickened, the heat from the heat generating element is hardly transferred to the mat disposed outside the inner tube. If such a situation arises, it takes a long time to evaporate water allowed to stay in the mat disposed outside the inner tube.

In this arrangement, the temperature is raised by receiving the heat from the heat generating element on the inner circumferential surface side of the inner tube, and the temperature is lowered on account of the release of the heat from the case to the outside on the outer circumferential surface side of the inner tube. Therefore, if the thickness of the insulating layer is identical between the inner circumferential surface and the outer circumferential surface of the inner tube, the insulation resistance value, which is provided on the outer circumferential surface side, is larger than the insulation resistance value which is provided on the inner circumferential surface side. Therefore, when the insulating layer is thickened on the outer circumferential surface side of the inner tube, it is possible to effectively increase the insulation resistance value. That is, the temperature is low on the outer circumferential surface side of the inner tube as compared with the inner circumferential surface side. Therefore, it is possible to enhance the insulation performance by relatively thickening the insulating layer on the outer circumferential surface side. When the insulating layer is relatively thinned on the inner circumferential surface side of the inner tube to decrease the heat insulation effect, the heat from the heat generating element and/or the exhaust gas can be easily transferred to the mat disposed outside the inner tube. Accordingly, it is possible to suppress the water from staying in the mat.

In another aspect, in order to achieve the object as described above, according to the present invention, there is provided an electric heating catalyst comprising:

a heat generating element which generates heat by applying electricity;

a case which accommodates the heat generating element;

an inner tube which is provided between the heat generating element and the case;

a mat which is provided between the heat generating element and the inner tube and between the inner tube and the case and which insulates the electricity; and an electrode which is connected to the heat generating element and which supplies an electric power to the heat generating element, wherein:

the inner tube protrudes from the mat toward an upstream side and a downstream side in a flow direction of an exhaust gas;

an insulating layer, which insulates the electricity, is formed on a surface of the inner tube; and the insulating layer is thin at a portion which protrudes from the mat toward the upstream side or the downstream side in the flow direction of the exhaust gas as compared with a portion at which the mat is provided.

When the inner tube is allowed to protrude from the mat toward the upstream side or the downstream side in the flow direction of the exhaust gas, even if the water and the particulate matter (PM) adhere to the upstream end and the downstream end of the mat, then it is possible to suppress the flow of the electricity.

In this arrangement, the inner tube and the mat are brought in contact with each other at the portion of the inner tube at which the mat is provided. Therefore, it is feared that any short circuit may be formed by water allowed to stay in the mat. Therefore, the high insulation performance is required for the insulating layer. On the other hand, the mat has the heat insulation effect. Therefore, the temperature of the inner tube is maintained to be relatively high at the portion at which the mat is provided. Therefore, it is appropriate that the insulating layer is relatively thickened at the portion at which the mat is provided.

On the other hand, the temperature is easily lowered at the portion which protrudes from the mat toward the upstream side or the downstream side in the flow direction of the exhaust gas, because the heat is deprived from the inner tube when the temperature of the exhaust gas is lowered. Therefore, it is possible to maintain the insulation performance even when the insulating layer is thin. Therefore, the insulating layer can be relatively thinned at the portion which protrudes from the mat toward the upstream side or the downstream side in the flow direction of the exhaust gas.

In still another aspect, in order to achieve the object as described above, according to the present invention, there is provided an electric heating catalyst comprising:

a heat generating element which generates heat by applying electricity;

a case which accommodates the heat generating element;

an inner tube which is provided between the heat generating element and the case;

a mat which is provided between the heat generating element and the inner tube and between the inner tube and the case and which insulates the electricity; and an electrode which is connected to the heat generating element and which supplies an electric power to the heat generating element, wherein:

an insulating layer, which insulates the electricity, is formed on a surface of the inner tube;

a part of the electrode is formed on an outer circumferential surface of the heat generating element in a circumferential direction of the heat generating element; and the insulating layer is thick at least at a portion which is disposed in the vicinity of a portion to provide a shortest distance between each electrode and another electrode as compared with a portion in the vicinity of which any electrode does not exist.

The electrode, which is connected to the heat generating element, includes at least two electrodes, i.e., an anode and a cathode. When the difference in electric potential is generated between the anode and the cathode, the electricity is allowed to flow through the heat generating element. In this situation, the electricity flows through portions having small resistances. Therefore, the electricity tends to flow through the portion at which the distance between the anode and the cathode is the shortest. That is, the temperature of the heat generating element tends to be raised in the shortest route to connect the anode and the cathode. Therefore, when the insulating layer is relatively thickened in the vicinity of the portion at which the distance between each electrode and another electrode is the shortest, it is possible to secure the required insulation resistance value. When the electrode is formed along the outer circumference of the heat generating element, the distance between the electrodes is the shortest at the end portion of the electrode. Therefore, it is also appropriate that the insulating layer is relatively thickened in the vicinity of the end portion of the electrode.

As for the electrode, it is appropriate that the thickness is relatively thickened at least in the vicinity of the portion at which the distance between each electrode and another electrode is the shortest. However, in place thereof, it is also appropriate that the thickness is relatively thickened in the vicinity of the electrode. That is, it is also appropriate that the thickness of the insulating layer existing in the vicinity of the electrode is relatively thickened over the entire electrode. The "portion which is disposed in the vicinity of the portion to provide the shortest distance between each electrode and another electrode" may be a "portion which is disposed at a distance of less than a predetermined distance from a portion to provide a shortest distance between each electrode and another electrode". The "portion in the vicinity of which any electrode does not exist" may be a "portion which is separated by not less than a predetermined distance from the portion to provide the shortest distance between each electrode and another electrode".

Effect of the Invention

According to the present invention, it is possible to suppress the electricity from flowing through the case of the electric heating catalyst.

MODE FOR CARRYING OUT THE INVENTION

Specified embodiments of the electric heating catalyst according to the present invention will be explained below on the basis of the drawings. The following embodiments can be appropriately combined with each other.

First Embodiment

Figure 1:
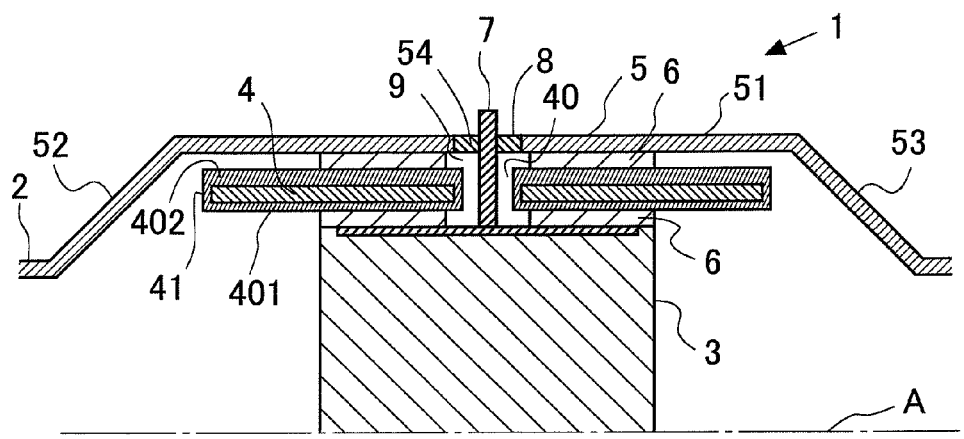
FIG. 1 shows a schematic arrangement of an electric heating catalyst according to a first embodiment.

FIG. 1 shows a schematic arrangement of an electric heating catalyst 1 according to a first embodiment of the present invention. The electric heating catalyst 1 according to this embodiment is provided for an exhaust tube 2 of an internal combustion engine carried on a vehicle. The internal combustion engine may be either a diesel engine or a gasoline engine. Further, the electric heating catalyst 1 can be also used for a vehicle which adopts a hybrid system provided with an electric motor.

The electric heating catalyst 1 shown in FIG. 1 is depicted in a sectional view obtained by cutting the electric heating catalyst 1 in the vertical direction along the central axis A of the exhaust tube 2. The shape of the electric heating catalyst 1 is linearly symmetric with respect to the central axis A. Therefore, only an upper part is shown in FIG. 1.

The electric heating catalyst 1 according to this embodiment comprises a columnar or cylindrical catalyst carrier 3 which has the center of the central axis A. The catalyst carrier 3, an inner tube 4, and a case 5 are provided in this order as referred to from the side of the central axis A. A mat 6 is provided between the catalyst carrier 3 and the inner tube 4 and between the inner tube 4 and the case 5.

A material, which behaves as an electric resistor and which generates the heat by applying the electricity, is used for the catalyst carrier 3. For example, SiC is used as the material of the catalyst carrier 3. The catalyst carrier 3 has a plurality of passages which extend in the direction of the flow of the exhaust gas (i.e., in the direction of the central axis A) and which have a honeycomb-shaped form provided in the cross section perpendicular to the direction of the flow of the exhaust gas. The exhaust gas flows through the passages. The outer shape of the catalyst carrier 3 is, for example, a columnar shape provided about the center of the central axis A of the exhaust tube 2. The cross-sectional shape of the catalyst carrier 3, which is taken along the cross section perpendicular to the central axis A, may be, for example, elliptic. The central axis A is the common central axis of the exhaust tube 2, the catalyst carrier 3, the inner tube 4, and the case 5.

The catalyst is carried on the catalyst carrier 3. The catalyst may be exemplified, for example, by the oxidation catalyst, the three way catalyst, the absorption reduction type NOx catalyst, and the selective reduction type NOx catalyst. Two electrodes 7 are connected to the catalyst carrier 3. The electricity is applied to the catalyst carrier 3 by applying the voltage between the electrodes 7. The catalyst carrier 3 generates the heat in accordance with the electric resistance of the catalyst carrier 3. In this embodiment, the catalyst carrier 3 corresponds to the heat generating element according to the present invention. The heat generating element may be also provided on the upstream side from the catalyst. Accordingly, the exhaust gas is heated or warmed by the heat generating element. When the exhaust gas is allowed to pass through the catalyst, it is possible to raise the temperature of the catalyst.

An electrically insulating material is used for the mat 6. For example, a ceramic fiber, which contains a main component of alumina, is used therefor. The mat 6 is wound around the outer circumferential surface of the catalyst carrier 3 and the outer circumferential surface of the inner tube 4. The mat 6 covers the outer circumferential surface of the catalyst carrier 3 (surface parallel to the central axis A). Therefore, the mat 6 suppresses the electricity from flowing through the inner tube 4 and the case 5 when the electricity is applied to the catalyst carrier 3.

A stainless steel material is used for the material of the inner tube 4. The inner tube 4 is formed to have a tube-shaped form about the center of the central axis A. The length in the direction of the central axis A of the inner tube 4 is longer than that of the mat 6. Therefore, the inner tube 4 protrudes from the mat 6 to the upstream side and the downstream side. The inner diameter of the inner tube 4 is substantially the same as the outer diameter of the mat 6 provided when the outer circumference of the catalyst carrier 3 is covered with the mat 6. When the mat 6 and the catalyst carrier 3 are accommodated in the inner tube 4, the mat 6 is compressed. Therefore, the catalyst carrier 3 is fixed at the inside of the inner tube 4 by means of the repulsive force of the mat 6.

An insulating layer 41 is formed on the surface of the inner tube 4. The insulating layer 41 is composed of, for example, a ceramic. Even when the metal is used for the inner tube 4, the electricity is suppressed from flowing through the inner tube 4, because the insulating layer 41 is formed on the surface of the inner tube 4.

A metal is used as the material of the case 5. It is possible to use, for example, a stainless steel material. The case 5 is constructed to include an accommodating portion 51 which is constructed to include a curved surface parallel to the central axis A, and tapered portions 52, 53 which connect the accommodating portion 51 and the exhaust tube 2 on the upstream side and the downstream side from the accommodating portion 51. The catalyst carrier 3, the inner tube 4, and the mat 6 are accommodated at the inside of the accommodating portion 51. Each of the tapered portions 52, 53 has such a tapered shape that the cross-sectional area of the passage is decreased at positions separated farther from the accommodating portion 51. That is, the cross-sectional area is decreased on the more upstream side in relation to the tapered portion 52 disposed on the upstream side from the catalyst carrier 3. The cross-sectional area is decreased on the more downstream side in relation to the tapered portion 53 disposed on the downstream side from the catalyst carrier 3. The inner diameter of the accommodating portion 51 is substantially the same as the outer diameter of the mat 6 provided when the outer circumference of the inner tube 4 is covered with the mat 6. When the mat 6 and the inner tube 4 are accommodated in the accommodating portion 51, the mat 6 is compressed. Therefore, the inner tube 4 is fixed at the inside of the accommodating portion 51 by means of the repulsive force of the mat 6.

The two electrodes 7 are connected to the catalyst carrier 3. In order to allow the electrodes 7 to pass, holes 40, 54 are provided through the inner tube 4 and the case 5 respectively. Further, the mat 6 is not provided around the electrodes 7 until the electrodes 7 are connected to the catalyst carrier 3. An insulating material 8, which supports the electrodes 7, is provided in the hole 54 which is bored through the case 5. The insulating material 8 is provided without any gap between the case 5 and the electrodes 7. In this way, an electrode chamber 9, which is a closed space, is formed around the electrodes 7 in the case 5. The inner tube 4 may be divided into a part which is disposed on the upstream side from the electrode chamber 9 and a part which is disposed on the downstream side therefrom, and the respective parts may be installed separately. The mat 6 may be also divided into a part which is disposed on the upstream side from the electrode chamber 9 and a part which is disposed on the downstream side therefrom, and the respective parts may be installed separately. When such an arrangement is adopted, the electrode chamber 9 makes a round around the catalyst carrier 3.

In the first embodiment of the present invention, the thickness of the insulating layer 41 formed on the surface of the inner tube 4 differs between the inner circumferential surface side and the outer circumferential surface side of the inner tube 4. That is, the insulating layer 401 disposed on the inner circumferential surface side of the inner tube 4 (hereinafter referred to as "inner insulating layer 401") is formed to be thinner than the insulating layer 402 disposed on the outer circumferential surface side of the inner tube 4 (hereinafter referred to as "outer insulating layer 402"). In this embodiment, the insulating layer 41 is formed by repeating the application and the calcination of the material. Therefore, the outer insulating layer 402 can be made relatively thick by increasing the number of times of the repetition on the outer circumferential surface side as compared with the inner circumferential surface side of the inner tube 4.

In the electric heating catalyst 1 constructed as described above, the water, which is condensed on the upstream side from the catalyst carrier 3, flows along the inner walls of the exhaust tube 2 and the case 5, and the water adheres to the mat 6 in some cases. In this situation, the water flows along the inner wall of the accommodating portion 51. Therefore, the water adheres to the mat 6 disposed between the inner tube 4 and the accommodating portion 51. The water is suppressed from entering the inside from the inner tube 4, owing to the presence of the inner tube 4. Further, the water is more suppressed from entering the inside from the inner tube 4, because the inner tube 4 protrudes to the upstream side and the downstream side as compared with the mat 6. Therefore, the short circuit formation is suppressed, which would be otherwise caused between the case 5 and the catalyst carrier 3 by the aid of the water. Further, the water, which enters the inside of the mat 6, is removed by being evaporated by the heat brought about from the catalyst carrier 3.

If the particulate matter (hereinafter referred to as "PM"), which is contained in the exhaust gas, adheres to the mat 6 and/or the inner tube 4, it is feared that the short circuit may be formed by PM between the case 5 and the catalyst carrier 3. However, the inner tube 4 protrudes from the mat 6, and thus the heat of the exhaust gas is received to raise the temperature at the protruding portion. Therefore, PM, which adheres to the inner tube 4, can be oxidized and removed. Accordingly, the short circuit formation is suppressed, which would be otherwise caused by PM between the case 5 and the catalyst carrier 3.

Figure 2:
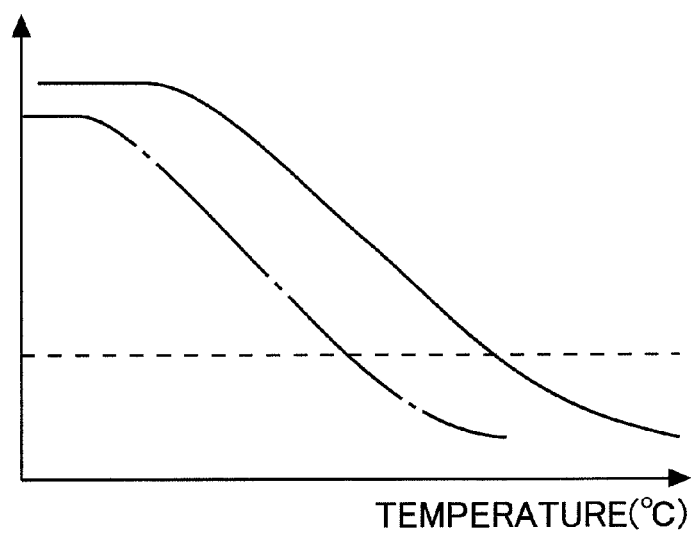
FIG. 2 shows a relationship between the temperature and the insulation resistance value of an insulating layer.

In this context, FIG. 2 shows a relationship between the temperature and the insulation resistance value of the insulating layer 41. The solid line indicates a case in which the insulating layer 41 is relatively thick, and the alternate long and short dash line indicates a case in which the insulating layer 41 is relatively thin. The broken line indicates the lower limit value of the insulation resistance value required for the insulating layer 41.

As for the insulating layer 41, the higher the temperature is, the smaller the insulation resistance value is. That is, the higher the temperature is, the more easily the electricity flows. At the same temperature, the thicker the insulating layer 41 is, the larger the insulation resistance value is. Therefore, it is appropriate that the insulating layer 41 is thickened in order to secure the required insulation resistance value under the high temperature condition.

On the other hand, the insulating layer 41 also has the heat insulation performance. Therefore, the thicker the insulating layer 41 is, the higher the heat insulation performance is. Therefore, if the insulating layer 41 is excessively thickened, the heat, which is transferred from the catalyst carrier 3, is hardly transmitted to the mat 6 disposed outside the inner tube 4. Therefore, it takes a long time to evaporate water allowed to stay in the mat 6 disposed outside the inner tube 4.

In this context, the temperature is high on the inner circumferential surface side of the inner tube 4, because the heat is received from the catalyst carrier 3. On the other hand, the temperature is low on the outer circumferential surface side of the inner tube 4, because the heat is released from the case 5. Therefore, if the thickness of the insulating layer 41 is identical between the inner circumferential surface side and the outer circumferential surface side of the inner tube 4, the insulation resistance value, which is provided on the outer circumferential surface side having the lower temperature, is larger than the insulation resistance value which is provided on the inner circumferential surface side.

Therefore, when the outer insulating layer 402 is thickened, and the inner insulating layer 401 is thinned by an amount corresponding thereto, then it is possible to raise the insulation resistance value as a whole, even when the thickness is identical in relation to the entire insulating layer 41. When the inner insulating layer 401 is thinned by the amount corresponding to an amount by which the outer insulating layer 402 is thickened, it is possible to suppress the increase in the heat insulation performance. Therefore, it is also possible to evaporate water allowed to stay in the mat 6 disposed outside the inner tube 4.

Further, when the inner insulating layer 401 is thinned, the temperature of the inner tube 4 is easily raised. When the outer insulating layer 402 is thickened, it is possible to suppress the release of the heat from the inner tube 4 to the case 5. That is, the temperature of the inner tube 4 can be maintained to be high. Therefore, it is possible to facilitate the oxidation of the particulate matter (PM) adhered to the portion at which the inner tube 4 is allowed to protrude toward the upstream side or the downstream side from the mat 6. That is, it is possible to suppress the short circuit formation which would be otherwise caused by PM.

In this way, even when the total value of the thicknesses of the inner insulating layer 401 and the outer insulating layer 402 is identical, the insulation resistance value of the entire insulating layer 41 can be increased, when the outer insulating layer 402 is relatively thickened as compared with when the thickness of the insulating layer is identical between the inner insulating layer 401 and the outer insulating layer 402. Further, it is possible to suppress the increase in the total value of the thicknesses in relation to the entire insulating layer 41. Therefore, it is possible to suppress any unsuccessful transfer of the heat to the mat 6 disposed outside the inner tube 4.

Second Embodiment

Figure 3:
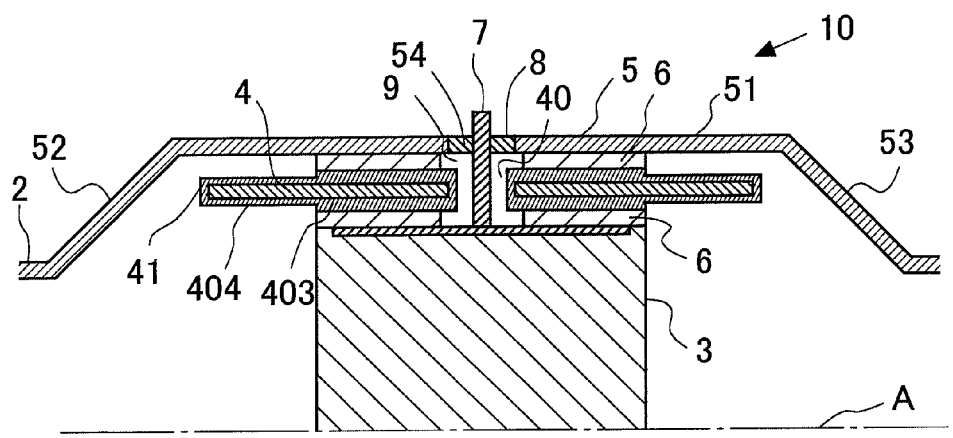
FIG. 3 shows a schematic arrangement of an electric heating catalyst according to a second embodiment.

FIG. 3 shows a schematic arrangement of an electric heating catalyst 10 according to a second embodiment of the present invention. An explanation will be made about the points or features different from those of the electric heating catalyst 1 shown in the first embodiment. The members, which are the same as those of the electric heating catalyst 1 shown in the first embodiment, are designated by the same reference numerals.

In this embodiment, the insulating layer 41, which is the insulating layer 41 formed on the surface of the inner tube 4 and which is formed at the portion at which the mat 6 is provided (portion to make contact with the mat 6), is referred to as "intra-mat insulating layer 403". On the other hand, the insulating layer 41, which is the insulating layer 41 formed on the surface of the inner tube 4 and which is formed at the portion to protrude from the mat 6 to the upstream side or the downstream side of the exhaust gas, is referred to as "extra-mat insulating layer 404". The intra-mat insulating layer 403 may be the insulating layer 41 which is disposed on the downstream side from the upstream end of the mat 6 and which is disposed on the upstream side from the downstream end of the mat 6. On the other hand, the extra-mat insulating layer 404 may be the insulating layer 41 which is formed at the portion disposed on the upstream side from the upstream end of the mat 6 or the insulating layer 41 which is formed at the portion disposed on the downstream side from the downstream end of the mat 6.

In this embodiment, the extra-mat insulating layer 404 is formed to be thinner than the intra-mat insulating layer 403. In this arrangement, the insulating layer 41 is formed by repeating the application and the calcination of the material. Therefore, when the number of times of the repetition is increased for the intra-mat insulating layer 403 as compared with the extra-mat insulating layer 404, it is possible to relatively thicken the intra-mat insulating layer 403.

In this context, it is necessary to avoid the short circuit formation caused by the water allowed to stay in the mat 6. Therefore, the high insulation performance is required for the intra-mat insulating layer 403. Owing to the heat insulation effect of the mat 6, the temperature of the intra-mat insulating layer 403 is maintained to be relatively high. Therefore, it is preferable that the intra-mat insulating layer 403 is thick. That is, even when the temperature is high, it is possible to secure the required insulation resistance value, on condition that the intra-mat insulating layer 403 is thickened beforehand.

On the other hand, as for the extra-mat insulating layer 404, the temperature is easily lowered, because the heat is deprived by the exhaust gas when the temperature of the exhaust gas is lowered. Therefore, even when the extra-mat insulating layer 404 is thinned, it is possible to secure the required insulation resistance value.

Figure 4:
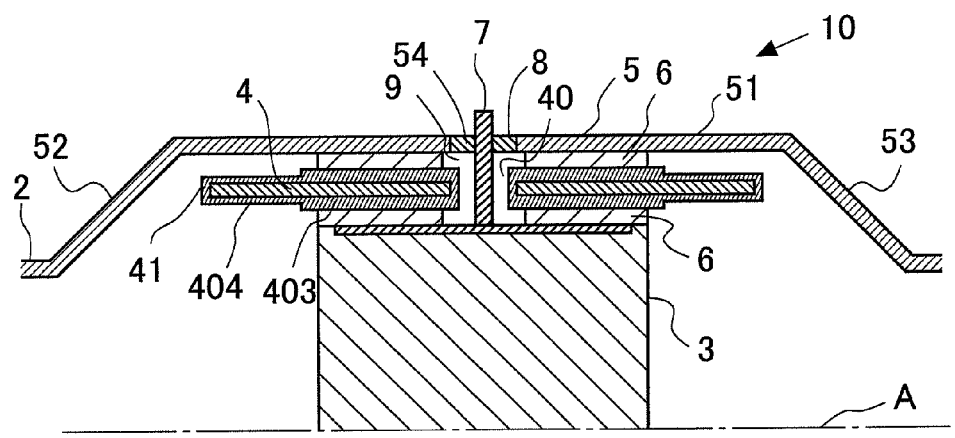
FIG. 4 shows a schematic arrangement of an electric heating catalyst provided when the insulating layer is relatively thickened at a portion at which a mat is provided and a portion which is disposed in the vicinity thereof.

Even in the case of the portion protruding from the mat 6, it is also allowable that the thickness of the insulating layer 41 is the same as that of the intra-mat insulating layer 403, provided that the portion is disposed in the vicinity of the mat 6. That is, the insulating layer 41 may be relatively thickened at the portion at which the mat 6 is provided and at the portion which is disposed in the vicinity thereof. FIG. 4 shows a schematic arrangement of an electric heating catalyst 10 provided when the insulating layer 41 is relatively thickened at a portion at which the mat 6 is provided and a portion which is disposed in the vicinity thereof. The range, in which the insulating layer 41 is relatively thickened, may be a range of arrival of water adhered to the upstream end or the downstream end of the mat 6. That is, it is also allowable to provide such a range that the high insulation performance is required in order to avoid the short circuit formation caused by water. Even in the case of the portion protruding from the mat 6, the temperature of the insulating layer 41 is maintained to be high, provided that the portion is disposed in the vicinity of the mat 6. Therefore, it is also appropriate to relatively thicken the insulating layer 41 disposed within a range in which it is feared that the insulation resistance value may be lowered due to the high temperature.

As explained above, according to the second embodiment of the present invention, it is possible to suppress the areal size in which the insulating layer is thickened, while securing the required insulation resistance value by thickening the intra-mat insulating layer 403 and thinning the extra-mat insulating layer 404. Therefore, it is possible to suppress the increase in the cost.

Third Embodiment

Figure 5:
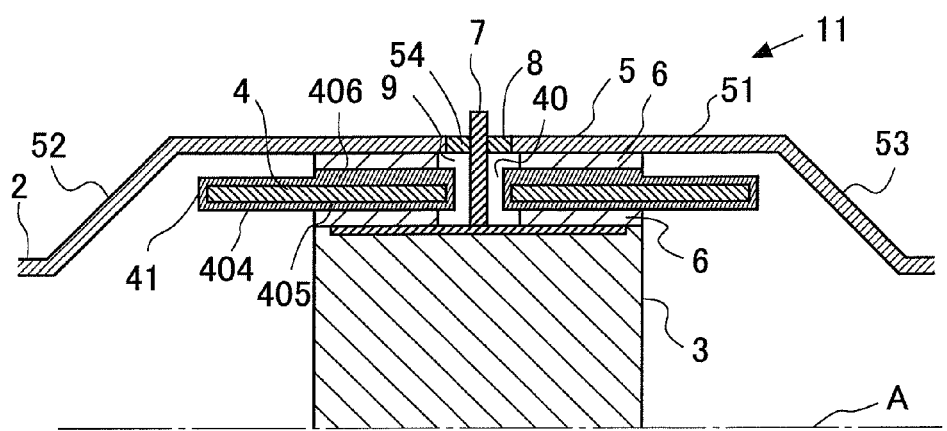
FIG. 5 shows a schematic arrangement of an electric heating catalyst according to a third embodiment.

FIG. 5 shows a schematic arrangement of an electric heating catalyst 11 according to a third embodiment of the present invention. An explanation will be made about the points or features different from those of the electric heating catalysts 1, 10 shown in the first and second embodiments. The members, which are the same as those of the electric heating catalysts 1, 10 shown in the first and second embodiments, are designated by the same reference numerals.

In this embodiment, the insulating layer 41, which is the insulating layer 41 disposed at the portion at which the mat 6 is provided and which is disposed on the inner circumferential surface side of the inner tube 4, is referred to as "intra-mat inner insulating layer 405". On the other hand, the insulating layer 41, which is the insulating layer 41 disposed at the portion at which the mat 6 is provided and which is disposed on the outer circumferential surface side of the inner tube 4, is referred to as "intra-mat outer insulating layer 406". Further, the insulating layer 41, which is the insulating layer 41 formed on the surface of the inner tube 4 and which is formed at the portion to protrude from the mat 6 to the upstream side or the downstream side of the exhaust gas, is referred to as "extra-mat insulating layer 404".

In the electric heating catalyst 11 shown in FIG. 5, the intra-mat outer insulating layer 406 is made thicker than the insulating layer 41 disposed at the other portions. That is, the intra-mat outer insulating layer 406 is formed to be thicker than the intra-mat inner insulating layer 405 and the extra-mat insulating layer 404.

In this arrangement, the insulating layer 41 is formed by repeating the application and the calcination of the material. Therefore, when the number of times of the repetition is increased for only the intra-mat outer insulating layer 406 as compared with the other, it is possible to relatively thicken the intra-mat outer insulating layer 406.

In this way, the insulation resistance value of the entire insulating layer 41 can be increased by thickening the intra-mat outer insulating layer 406 as compared with the intra-mat inner insulating layer 405 at the portion to make contact with the mat 6. Further, it is possible to suppress the increase in the thicknesses of the entire insulating layer 41. Therefore, it is possible to suppress any unsuccessful transfer of the heat to the mat 6 disposed outside the inner tube 4.

When the extra-mat insulating layer 404 is thinned, and the intra-mat outer insulating layer 406 is thickened, then it is possible to suppress the areal size in which the insulating layer is thickened, while securing the required insulation resistance value. Therefore, it is possible to suppress the increase in the cost.

Figure 6:
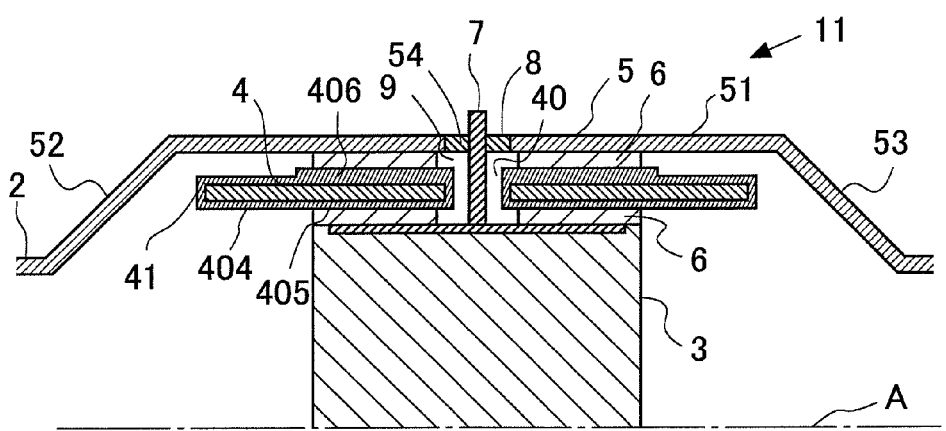
FIG. 6 shows a schematic arrangement of an electric heating catalyst provided when the insulating layer, which is disposed on an outer circumferential surface side of an inner tube, is relatively thickened at a portion at which a mat is provided and a portion which is disposed in the vicinity thereof.

Even in the case of the portion protruding from the mat 6, it is also allowable that the thickness of the insulating layer 41 disposed on the outer circumferential surface side of the inner tube 4 is the same as that of the intra-mat outer insulating layer 406, provided that the portion is disposed in the vicinity of the mat 6. That is, the insulating layer 41 may be relatively thickened at the portion at which the mat 6 is provided on the outer circumferential surface side of the inner tube 4 and at the portion which is disposed in the vicinity thereof. FIG. 6 shows a schematic arrangement of an electric heating catalyst 11 provided when the insulating layer 41, which is disposed on the outer circumferential surface side of the inner tube 4, is relatively thickened at a portion at which the mat 6 is provided and a portion which is disposed in the vicinity thereof. The range, in which the insulating layer 41 is relatively thickened, may be a range of arrival of water adhered to the upstream end or the downstream end of the mat 6. That is, it is also allowable to provide such a range that the high insulation performance is required in order to avoid the short circuit formation caused by water. Even in the case of the portion protruding from the mat 6, the temperature of the insulating layer 41 is maintained to be high, provided that the portion is disposed in the vicinity of the mat 6. Therefore, it is also appropriate to relatively thicken the insulating layer 41 disposed on the outer circumferential surface side of the inner tube 4, within a range in which it is feared that the insulation resistance value may be lowered due to the high temperature.

Fourth Embodiment

Figure 7:
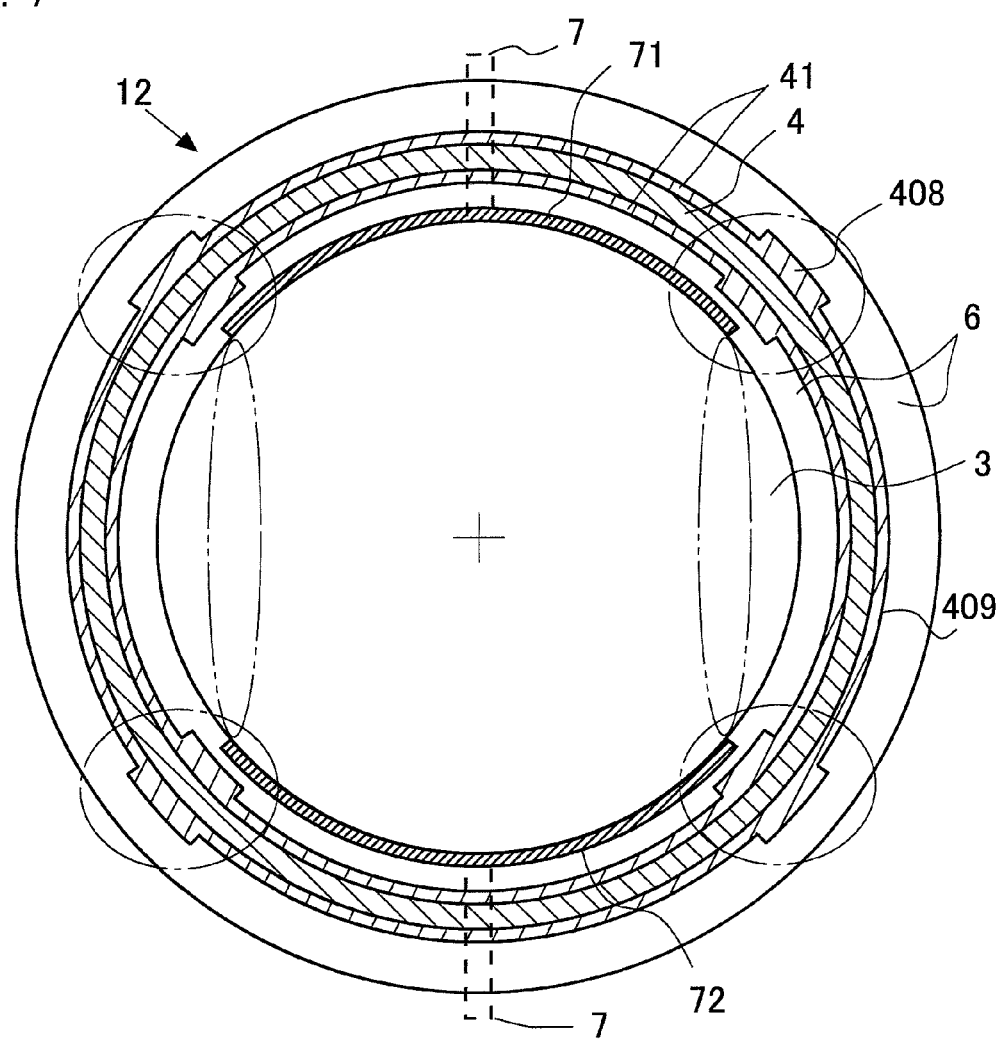
FIG. 7 shows a schematic arrangement of an electric heating catalyst according to a fourth embodiment.

FIG. 7 shows a schematic arrangement of an electric heating catalyst 12 according to a fourth embodiment of the present invention. An explanation will be made about the points or features different from those of the electric heating catalyst 1 shown in the first embodiment. The members, which are the same as those of the electric heating catalyst 1 shown in the first embodiment, are designated by the same reference numerals.

FIG. 7 shows a sectional view obtained by cutting the electric heating catalyst 12 along the plane perpendicular to the central axis. In FIG. 7, the hatching is omitted for those other than the inner tube 4, the insulating layer 41, and the electrode 7. In this arrangement, the electrode 7 includes an anode 71 and a cathode 72. The anode 71 and the cathode 72 are provided along the outer circumferential surface of the catalyst carrier 3. The catalyst carrier 3 exists between the anode 71 and the cathode 72, and thus the electricity flows through the catalyst carrier 3. In this context, the electricity flows through the portion at which the resistance is small. Therefore, the electricity mainly flows through the portion at which the distance between the anode 71 and the cathode 72 is the shortest (see portions surrounded by alternate long and two short dashes lines shown in FIG. 7). Therefore, the temperature is easily raised at the portion at which the distance from another electrode is the shortest as compared with the other portions, in relation to each of the anode 71 and the cathode 72. Therefore, it is feared that the insulation resistance value of the insulating layer 41 may be lowered in the vicinity of the concerning portion.

In relation thereto, when the insulating layer 41 is thickened at the portion at which the temperature is raised, it is possible to secure the required insulation resistance value. That is, the insulating layer 408, which is disposed in the vicinity of the portion at which the distance from another electrode is the shortest in relation to each of the anode 71 and the cathode 72 (see portions surrounded by alternate long and short dash lines shown in FIG. 7), is made thicker than the insulating layer 409 in the vicinity of which the electrode 7 does not exists. Accordingly, it is possible to suppress the deterioration of the insulation performance. The range, in which the insulating layer 41 is relatively thickened, can be determined as a range in which it is feared that the insulation resistance value may be lowered by the heat, for example, by means of an experiment. Alternatively, it is also allowable to relatively thicken the insulating layer 41 disposed at a distance of less than a predetermined distance from the portion at which the distance from another electrode is the shortest in relation to each of the anode 71 and the cathode 72. The predetermined distance can be determined as a range in which it is feared that the insulation resistance value may be lowered by the heat, for example, by means of an experiment.

Figure 8:
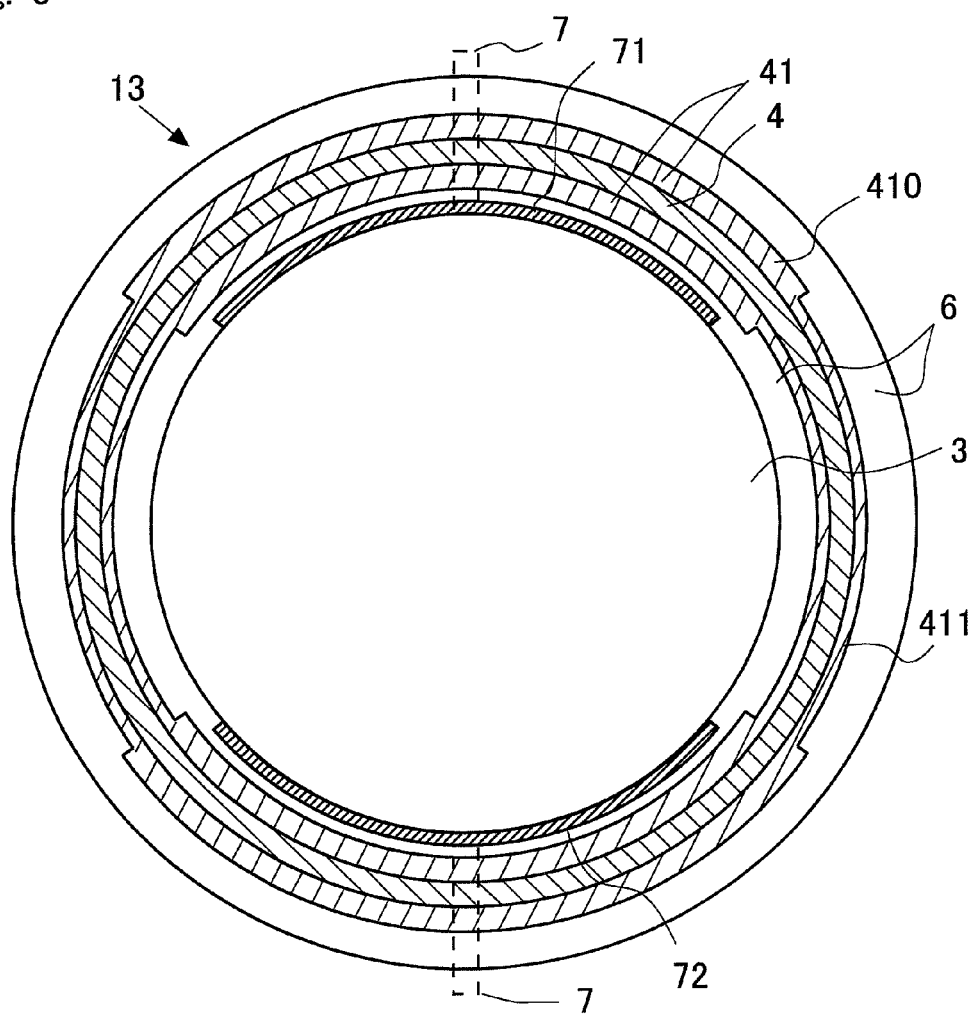
FIG. 8 shows another schematic arrangement of an electric heating catalyst according to the fourth embodiment.

FIG. 8 shows another schematic arrangement of an electric heating catalyst 13 according to the fourth embodiment of the present invention. FIG. 8 shows a sectional view obtained by cutting the electric heating catalyst 13 along the plane perpendicular to the central axis. In FIG. 8, the hatching is omitted for those other than the inner tube 4, the insulating layer 41, and the electrode 7.

In the electric heating catalyst 13 shown in FIG. 8, the insulating layer 41 is thickened in the vicinity of the anode 71 and the cathode 72. That is, an insulating layer 410, which is disposed in the vicinity of the electrode 7, is made thicker than an insulating layer 411 in the vicinity of which the electrode 7 does not exist. Accordingly, even when the temperature of the entire electrode 7 is raised, it is possible to secure the required insulation resistance value. It is also allowable that the insulating layer 41, which is disposed at a distance of less than a predetermined distance from the electrode 7, may be relatively thickened.

PARTS LIST

1: electric heating catalyst, 2: exhaust tube, 3: catalyst carrier, 4: inner tube, 5: case, 6: mat, 7: electrode, 8: insulating material, 9: electrode chamber, 41: insulating layer, 401: inner insulating layer, 402: outer insulating layer.

The invention claimed is:
1. An electric heating catalyst comprising:
a heat generating element which generates heat by applying electricity;
a case which accommodates the heat generating element;
an inner tube which is provided between the heat generating element and the case;
a mat which is provided between the heat generating element and the inner tube and between the inner tube and the case and which insulates the electricity; and an electrode which is connected to the heat generating element and which supplies an electric power to the heat generating element, wherein:

an insulating layer, which insulates the electricity, is formed on a surface of the inner tube; and the insulating layer is thin at a portion which is disposed on an inner circumferential surface side as compared with a portion which is disposed on an outer circumferential surface side of the inner tube.

2. An electric heating catalyst comprising:

a heat generating element which generates heat by applying electricity;

a case which accommodates the heat generating element;

an inner tube which is provided between the heat generating element and the case;

a mat which is provided between the heat generating element and the inner tube and between the inner tube and the case and which insulates the electricity; and an electrode which is connected to the heat generating element and which supplies an electric power to the heat generating element, wherein:

the inner tube protrudes from the mat toward an upstream side and a downstream side in a flow direction of an exhaust gas;

an insulating layer, which insulates the electricity, is formed on a surface of the inner tube; and the insulating layer is thin at a portion which protrudes from the mat toward the upstream side or the downstream side in the flow direction of the exhaust gas as compared with a portion at which the mat is provided.

3. An electric heating catalyst comprising:

a heat generating element which generates heat by applying electricity;

a case which accommodates the heat generating element;

an inner tube which is provided between the heat generating element and the case;

a mat which is provided between the heat generating element and the inner tube and between the inner tube and the case and which insulates the electricity; and an electrode which is connected to the heat generating element and which supplies an electric power to the heat generating element, wherein:

an insulating layer, which insulates the electricity, is formed on a surface of the inner tube;

a part of the electrode is formed on an outer circumferential surface of the heat generating element in a circumferential direction of the heat generating element; and the insulating layer is thick at least at a portion which is disposed in the vicinity of a portion to provide a shortest distance between each electrode and another electrode as compared with a portion in the vicinity of which any electrode does not exist.

\* \* \* \* \*